March 14, 1933. E. O. CUMMINGS 1,901,364
PROCESS OF MAKING BASIC METAL SULPHATES AND RECOVERY
OF METAL FROM WASTE METALLIC COMPOUNDS
Filed Nov. 28, 1930
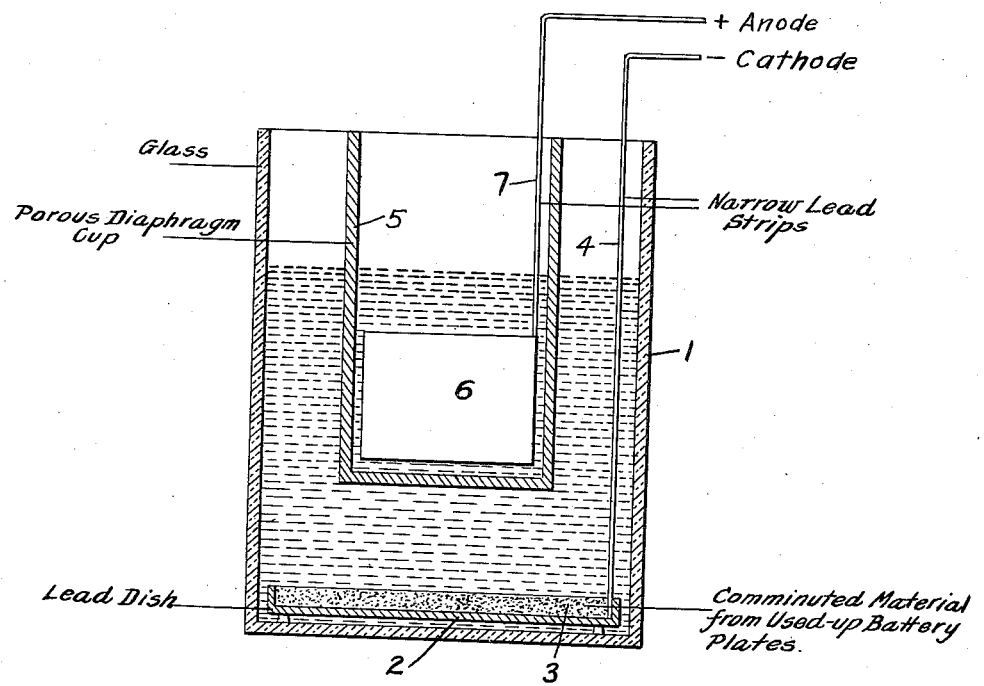
Inventor
Edmund O. Cummings,
By Chas. Silver  Attorney Patented Mar. 14, 1933

1,901,364

UNITED STATES PATENT OFFICE

EDMUND OLIN CUMMINGS, OF HIGH POINT, NORTH CAROLINA

PROCESS OF MAKING BASIC METAL SULPHATES AND RECOVERY OF METAL FROM WASTE METALLIC COMPOUNDS

Application filed November 28, 1930. Serial No. 498,601.

This invention relates to a process for making basic metallic salts and has specific reference to the manufacture of basic lead sulphate.

Among the objects of this invention is the production of basic metallic compounds, more specifically basic lead sulphate, by a process involving the electrolytic solution of a metal in the anode compartment of a two-compartment cell, the simultaneous reduction of a metallic sulphate, oxide, or peroxide, or mixture of these or other salts in the cathode compartment, the production of a soluble alkali metal sulphate and free alkali in the cathode compartment, the removal of the two solutions continuously or non-continuously, and the mixing of them in the proportions required to obtain a basic metal sulphate having the desired percentages of metal oxide and sulphate. Another object of this invention consists in the manufacture of basic lead sulphate by reducing at the cathode the lead compounds obtained from used storage battery plates. A further object of this invention is the recovery of lead from lead wastes, sulphated lead compounds, lead oxides and peroxides, and more particularly the powder obtained from junk battery plates.

Other, further and more specific objects of this invention will become readily apparent to those skilled in the art from a consideration of the following description when taken in conjunction with the accompanying drawing.

This drawing shows in cross-section a two-compartment electrolytic cell comprising the container 1, of glass or other suitable material, wherein the metallic dish 2 is positioned. Within this dish 2, which is preferably of lead, is placed the comminuted material 3, from used battery plates, drosses, or lead wastes. A lead 4 extends from the dish 2 to the negative pole of a direct current generator. Within the container 1, there is also disposed the porous cup diaphragm 5, and within this cup is positioned the anode 6. The porous diaphragm may be unglazed porcelain, alundum, asbestos, etc., while the anode 6 is lead or a lead alloy. The numeral 7 indicates a lead wire extending from the anode 6, to the positive pole of the generator.

Junk battery plates contain oxides, peroxide, and sulphates of lead held in shape by a grid composed of an alloy of lead and antimony. These compounds are removed from the grid by any suitable process, for example, the grid by a pebble mill and sifting, which treatment in a pebble mill and sifting, which removes these compounds of lead in powdery form. This powdery material is placed on the lead dish in the cathode compartment of the cell 1.

In the anode compartment I prefer to use as the electrolyte a solution of sodium chlorate. Other electrolytes may be used in lieu of sodium chlorate, for example, the chlorides, chlorates, nitrates, and acetates of sodium, potassium, ammonium, magnesium, aluminum, zinc, etc. The corresponding acids and mixtures of these salts with or without the acids may also be used. Chlorates and acetates are in general preferred, due to their higher solubility and the desire to produce very soluble salts of lead. A solution of a mixture of chlorates and acetates also is very suitable for the electrolyte. For the cathode compartment, the electrolyte may also be sodium chlorate, or a solution of sodium chlorate and acetate. In lieu of these, I may use acids, alkalies, salts or mixtures of salts with or without acids or alkalis. The catholyte must be such that it will not give a precipitate with an alkali metal sulphate nor be reduced by the current before the lead compounds in the lead dish are electrolytically reduced.

My preferred solution for both anode and cathode compartments is a 10% solution of sodium chlorate in water. However, other concentrations of sodium chlorate or of sodium chlorate and acetate may be employed. A cathode current density of 1.3 amperes per 100 sq. cm. is very suitable while the anode current density is of little importance. The anode may be of cast lead, lead alloy, or the spongy lead obtained by the reduction of the lead compounds at the cathode. The cathode may be made of sheet lead or a lead dish upon which is placed the metallic compound to be reduced.

During the electrolysis the lead anode dissolves and there is formed in the anolyte a solution of lead chlorate. The powdery material at the cathode is simultaneously reduced to spongy lead and there is formed in the cathode solution sodium sulphate and sodium hydroxide, viz:

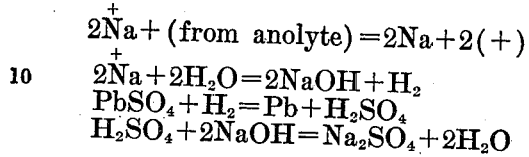

It is generally known that in case there is a tendency for the sulphate ion to travel through the diaphragm and thus cause an insoluble precipitate of lead sulphate in the anolyte, an increase of pressure on the anolyte solution minimizes the difficulty. This increase of pressure may easily be obtained by maintaining the level of the anode solution higher than that of the cathode solution.

The anode and cathode solutions may be removed either continuously or non-continuously. Where it is found that the cathode solution is slightly colored it may be decolorized using the usual chemical means, for example, by heating with animal charcoal and filtering; by adding a small amount of aluminum sulphate to the solution and then filtering; or by adding a small amount of the anode solution to the cathode solution and filtering. Then samples of the catholyte and anolyte may be analyzed. If necessary, either an alkali metal sulphate or free alkali, or sulphuric acid may be added to the catholyte in order that the concentrations may be such that when mixed with the anolyte a precipitate of basic lead sulphate having the desired percentages of lead oxide and sulphate may be formed. If an acid is employed in the anolyte or if an acid or base is used in the catholyte, a sufficient quantity of neutralizing material must be added to give the desired concentrations of sulphate and alkali hydroxide to produce the desired percentages of lead oxide and sulphate in the basic lead sulphate.

Upon mixing said anolyte and catholyte a very white, flocculent, non-crystalline precipitate of basic lead sulphate is obtained. Practically the theoretical amount of lead for the current used is dissolved at the anode. This assures a high yield of basic lead sulphate. The spongy lead obtained at the cathode may be melted and poured into a mold and then used for the anode in further electrolysis, or it may be used in the spongy form. The solution obtained from mixing the anolyte and catholyte contains sodium chlorate and may be used again, thus completing the cycle of operations.

In carrying out the process, if the solutions from the separate compartments are brought together gradually, larger particles of the precipitated basic lead sulphate are obtained than if the solutions are mixed rapidly. This affords a means for regulating the size of the particles as well as the relative quantities of any size to the other sizes.

The above procedure may be changed to give a white material having somewhat different properties by converting a part of the soluble lead salt in a portion of the anolyte into lead hydroxide by adding an alkali metal hydrate to the said portion of anolyte and by then adding slightly alkaline alkali metal sulphate to the remaining anolyte. The precipitated lead hydroxide and lead sulphate may then be mixed. The percentage of lead hydroxide, or sulphate, in the material may thus be varied at will.

This process may be carried out continuously as well as intermittently. In the former case, fresh materials at the anode and cathode are continuously added to compensate for what has been used up in the electrolysis, while each compartment of the cell is continuously supplied with the desired electrolyte to compensate for that which is withdrawn. When employing sodium chlorate in each compartment of the cell, after electrolysis, the anode compartment will contain lead chlorate and sodium chlorate in solution. The catholyte will contain a solution of sodium sulphate, sodium chlorate and sodium hydroxide. When these solutions are combined the reaction may be represented as follows:

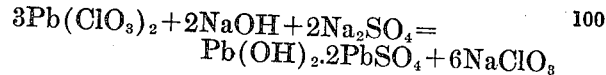

The percentages of lead hydroxide and lead sulphate in the basic salt may be varied by varying the amounts of alkali metal sulphate and alkali metal hydroxide in the catholyte. The sodium chlorate remains in solution and may again serve as the electrolyte.

This process may be employed for converting antimonial lead or other lead alloys into basic lead sulphate, since the antimony does not dissolve under these circumstances and collects upon the bottom of the cup.

The process may also be modified for the manufacture of mixtures of pigments, for example, by adding sodium carbonate or carbon dioxide to the cathode solution before mixing with the anode solution. Also, by adding a solution of a zinc salt or barium salt or other metal salt to the anode solution before mixing with the cathode solution, a double basic compound of lead and another metal may be formed. A basic compound of lead and zinc may be formed by using an alloy of lead and zinc for the anode in the above process.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making basic metal sulphates, electrolytically reducing in the cathode compartment of a two-compartment cell powdered waste metal compounds containing sulphate material while simultaneously dissolving an anode consisting of the previously reduced waste metal compounds, using as anolyte a solution which forms no precipitate with a water soluble compound of the anode metal and as catholyte a solution which gives no precipitate with alkali metal sulphates, after the electrolysis removing separately the anolyte and catholyte, adjusting the alkali and sulphate content of the catholyte so that when mixed with the anolyte a basic metal sulphate having the desired percentages of oxide and sulphate will be obtained, then mixing the two solutions, filtering, and washing the pigment.

2. In a process of making a basic metal sulphate, electrolytically reducing metallic sulphated material at the cathode using a catholyte which gives no precipitate with alkali metal sulphates and is not reduced by the current under these circumstances, using as anolyte a solution whose anions form a water soluble salt with the metal of said anode, and then mixing the anolyte and catholyte resulting from this electrolysis.

3. In a process of making a basic lead sulphate, electrolytically reducing at the cathode metallic sulphated material and treating the catholyte resulting from this electrolysis with a solution of a lead compound.

4. In a process of making basic lead sulphate, electrolytically reducing metallic sulphated material at the cathode of a two-compartment cell with a catholyte which gives no precipitate with an alkali metal sulphate and is not reduced under the circumstances, simultaneously dissolving lead from an electrode in the anode compartment containing an electrolyte whose anions form a water soluble salt with the lead, and then mixing the anolyte and catholyte resulting from this electrolysis.

5. In a process of making basic lead sulphate, electrolytically reducing metallic sulphated material at the cathode of a two-compartment cell, using a catholyte which gives no precipitate with alkali metal sulphates and is not reduced by the current under these circumstances, while dissolving lead from an electrode in the anode compartment containing an electrolyte of a substance which forms a water soluble lead salt with the dissolved lead, and then mixing the anolyte and catholyte resulting from this electrolysis in the predetermined ratio of anolyte to catholyte to give a product of the desired percentages of lead oxide and sulphate.

6. In a continuous process for making basic lead sulphate, electrolytically reducing metallic sulphated material at the cathode of a two-compartment cell using a catholyte which gives no precipitate with alkali metal sulphates and is not reduced under the circumstances, simultaneously dissolving lead from an electrode in the anode compartment containing an electrolyte whose anions form a water soluble salt with the lead, constantly removing the anolyte and catholyte, mixing the anolyte and catholyte resulting from this electrolysis in proportions to give the desired basic lead sulphate, removing the precipitated basic lead sulphate, and continually introducing into the anode and cathode compartments a sufficient amount of the filtrate obtained in this precipitation to replenish that which is withdrawn from these compartments.

7. In a process for making basic lead sulphate, electrolytically reducing metallic sulphated material at the cathode of a two-compartment cell using a catholyte which gives no precipitate with alkali metal sulphates and is not reduced under the circumstances, simultaneously dissolving lead from an electrode in the anode compartment containing an electrolyte whose anions form a water soluble salt with the lead, then removing anolyte and catholyte, adjusting the concentrations of free alkali and alkali metal sulphate in the catholyte, and then slowly mixing the anolyte and catholyte.

8. In a process for making basic lead sulphate, electrolytically reducing metallic sulphated material at the cathode of a two-compartment cell using a catholyte which gives no precipitate with alkali metal sulphates and is not reduced under the circumstances, simultaneously dissolving lead from an electrode in the anode compartment containing an electrolyte whose anions form a water soluble salt with the lead, then removing the anolyte and catholyte, adjusting the concentrations of free alkali and alkali metal sulphate in the catholyte, and then rapidly mixing the anolyte and catholyte.

9. In a process for making basic lead sulphate, electrolytically reducing at the cathode the sulphated and oxidized lead compounds of battery plates and treating the catholyte resulting from this electrolysis with a solution of a lead compound.

10. In a process for making basic lead sulphate, electrolytically reducing at the cathode the oxidized and sulphated lead compounds of battery plates using a catholyte which gives no precipitate with alkali metal sulphates and is not reduced by the current under these circumstances, simultaneously dissolving a lead anode in an electrolyte whose anions form a water soluble lead salt with the lead, removing the anolyte and catholyte, adjusting the free alkali and sulphate content of the catholyte so that when it is mixed with the anolyte a basic lead sulphate of the desired percentage of lead oxide and lead sulphate will be formed, and then mixing the resulting catholyte and anolyte.

11. In a process of making basic lead sulphate, electrolytically reducing at the cathode of a two-compartment cell the sulphated and oxidized compounds of battery plates using a catholyte which gives no precipitate with alkali metal sulphates and is not reduced by the current under these circumstances, simultaneously dissolving lead from an electrode in the anode compartment containing an electrolyte whose anions form a water soluble lead salt with the lead, removing and then mixing the anolyte and catholyte resulting from this electrolysis.

12. In a process of making basic lead sulphate, electrolytically reducing at the cathode oxidized and sulphated lead compounds of battery plates while dissolving a lead anode in an electrolyte comprising a solution of a chlorate of an alkali metal and then removing and mixing the anolyte and catholyte resulting from this electrolysis.

13. In a process of making basic lead sulphate, electrolytically reducing in the cathode compartment of a two-compartment cell the lead compounds of battery plates while dissolving lead in the anode compartment, the electrolytes of said anode and cathode compartments comprising a solution of a chlorate of an alkali metal, and then mixing the anolyte and catholyte resulting from this electrolysis.

14. In a proces of making basic lead sulphate, electrolytically reducing in the cathode compartment of a two-compartment cell the powdered lead compounds of junk battery plates while dissolving lead in the anode compartment, the electrolytes of said anode and cathode compartments comprising a solution of a chlorate of an alkali metal, withdrawing the anolyte and catholyte solutions, adjusting the concentrations of free alkali and alkali metal sulphate in the catholyte so that when it is added to the anolyte a basic sulphate having the desired percentages of lead oxide and lead sulphate will be formed, and then mixing the anolyte and catholyte.

15. In a process of making a basic metal sulphate, electrolytically reducing material comprising an oxide of the metal at the cathode, using as catholyte a solution which gives no precipitate with alkali metal sulphates and is not reduced by the current under these circumstances and as anolyte a solution whose anions form a water soluble salt with the metal of the anode, adding sufficient soluble sulphate to and adjusting the concentration of free alkali in the catholyte so that when it is added to the anolyte a basic metal sulphate having the desired percentages of metal oxide and metal sulphate will be formed, and then mixing the anolyte and catholyte.

16. In a process of making a basic metal sulphate, electrolytically reducing a substance comprising metallic sulphated material and an oxide of the metal at the cathode, using as catholyte a solution which gives no precipitate with alkali metal sulphates and is not reduced by the current under these circumstances and as anolyte a solution whose anions form a water soluble salt with the metal of the anode, and then mixing the anolyte and catholyte resulting from this electrolysis.

17. In a process of making a basic metal sulphate, electrolytically reducing material comprising an oxide of the metal at the cathode of a two-compartment cell, using a catholyte which gives no precipitate with alkali metal sulphates and is not reduced by the current under these circumstances, simultaneously dissolving the metal from an electrode in the anode compartment containing an anolyte whose anions form a water soluble salt with the metal of the anode, adding sufficient soluble sulphate to and adjusting the concentration of free alkali in the catholyte so that when it is added to the anolyte a basic metal sulphate having the desired percentages of metal oxide and metal sulphate will be formed, and then mixing the anolyte and catholyte.

18. In a process of making a basic lead sulphate, electrolytically reducing material comprising an oxide of lead at the cathode of a two-compartment cell, using a catholyte which gives no precipitate with alkali metal sulphates and is not reduced by the current under these circumstances, simultaneously dissolving lead from an electrode in the anode compartment containing an anolyte whose anions form a water soluble salt with the dissolved lead, adding sufficient soluble sulphate to and adjusting the concentration of free alkali in the catholyte so that when it is added to the anolyte a basic lead sulphate having the desired percentages of lead oxide and lead sulphate will be formed, and then mixing the anolyte and catholyte.

In testimony whereof I affix my signature.

EDMUND OLIN CUMMINGS.